US010692031B2

(12) United States Patent
Carley et al.

(10) Patent No.: US 10,692,031 B2
(45) Date of Patent: Jun. 23, 2020

(54) ESTIMATING SOFTWARE AS A SERVICE CLOUD COMPUTING RESOURCE CAPACITY REQUIREMENTS FOR A CUSTOMER BASED ON CUSTOMER WORKFLOWS AND WORKLOADS

(71) Applicant: International Business Machines Corporation, Armonk, NY (US)

(72) Inventors: Dave Carley, San Jose, CA (US); Andrew J. Stimer, Westerville, OH (US); Tracy Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 15/801,792

(22) Filed: Nov. 2, 2017

(65) Prior Publication Data
US 2019/0130326 A1    May 2, 2019

(51) Int. Cl.
*G06F 11/30* (2006.01)
*G06F 11/34* (2006.01)
*G06F 8/60* (2018.01)
*G06Q 10/06* (2012.01)

(52) U.S. Cl.
CPC ........... *G06Q 10/0633* (2013.01); *G06F 8/60* (2013.01); *G06F 11/302* (2013.01); *G06F 11/3457* (2013.01)

(58) Field of Classification Search
CPC ...... G06F 11/302; G06F 8/60; G06F 11/3457; G06Q 10/06315; G06Q 10/0633; G06Q 10/063
See application file for complete search history.

(56) References Cited

U.S. PATENT DOCUMENTS

| | | | | |
|---|---|---|---|---|
| 5,233,513 A | * | 8/1993 | Doyle | G06F 8/30 705/7.11 |
| 5,729,746 A | * | 3/1998 | Leonard | G06F 8/20 717/101 |
| 5,734,884 A | * | 3/1998 | Eberhard | G06F 11/34 |

(Continued)

OTHER PUBLICATIONS

Vargas, Jose et al., Cloud Computing Capacity Planning—Maximizing Cloud Value IBM, 2010 (Year: 2010).*

(Continued)

*Primary Examiner* — Scott L Jarrett
(74) *Attorney, Agent, or Firm* — Winstead PC (57) ABSTRACT

A method, system and computer program product for evaluating capacity needs of a customer. A selection of an industry workflow is received from the customer, or alternatively, the customer provides a custom workflow. Furthermore, the initial workload estimates and the capacity requirements for implementing the selected industry workflow or the custom workflow are determined based on the answers to a set of questions presented to the customer. A model is then created to represent a data flow of the selected/custom workflow as well as represent the transaction rates. A system is provisioned to simulate production usage based on the determined capacity requirements. Furthermore, a workload is simulated based on the model and the initial workload estimates. The usage patterns in the simulated workload and the usage of the system are monitored which are used to update the capacity requirements of the system.

20 Claims, 7 Drawing Sheets

(56) References Cited

U.S. PATENT DOCUMENTS

| | | | | |
|---|---|---|---|---|
| 5,903,453 | A * | 5/1999 | Stoddard, II | G06F 11/3616 700/79 |
| 6,086,618 | A * | 7/2000 | Al-Hilali | G06F 11/3447 703/2 |
| 6,219,654 | B1 * | 4/2001 | Ruffin | G06Q 10/06 705/400 |
| 6,539,340 | B1 * | 3/2003 | Robins | G06F 11/3409 370/232 |
| 6,578,141 | B2 * | 6/2003 | Kelley | G06Q 10/087 705/26.5 |
| 6,587,833 | B1 * | 7/2003 | Ruffin | G06Q 10/06 705/7.22 |
| 6,725,454 | B1 * | 4/2004 | Nagel | G06F 11/3495 709/220 |
| 6,738,736 | B1 * | 5/2004 | Bond | G06Q 10/10 703/2 |
| 6,850,530 | B1 * | 2/2005 | Waclawsky | H04L 45/00 370/401 |
| 6,859,922 | B1 | 2/2005 | Baker et al. | |
| 6,862,623 | B1 * | 3/2005 | Odhner | G06Q 10/06 709/226 |
| 6,898,564 | B1 * | 5/2005 | Odhner | G06F 11/3414 703/2 |
| 6,978,257 | B1 * | 12/2005 | Halbout | G06Q 30/0283 705/34 |
| 7,694,181 | B2 | 4/2010 | Noller et al. | |
| 7,769,616 | B2 * | 8/2010 | Ollivier | G06Q 10/00 705/7.25 |
| 7,797,147 | B2 * | 9/2010 | Vinberg | G06F 11/3447 703/1 |
| 7,831,976 | B2 * | 11/2010 | Grabarnik | G06F 9/505 709/208 |
| 7,836,451 | B2 * | 11/2010 | Grabarnik | G06F 9/5083 709/220 |
| 7,949,628 | B1 * | 5/2011 | Blazek | G06F 16/21 707/600 |
| 8,054,746 | B2 * | 11/2011 | Ozugur | H04L 12/14 370/232 |
| 8,055,606 | B2 | 11/2011 | Kreamer et al. | |
| 8,190,682 | B2 | 5/2012 | Paterson-Jones et al. | |
| 8,375,364 | B2 | 2/2013 | Udupa et al. | |
| 8,689,227 | B2 | 4/2014 | Blanding et al. | |
| 8,806,003 | B2 * | 8/2014 | Brown | G06F 9/5044 709/220 |
| 8,856,332 | B2 * | 10/2014 | Johnson | G06F 15/173 709/226 |
| 9,058,438 | B2 * | 6/2015 | Agrawal | G06F 17/50 |
| 9,104,803 | B2 | 8/2015 | Mansour et al. | |
| 9,300,552 | B2 * | 3/2016 | Dube | G06F 8/20 |
| 9,559,915 | B2 | 1/2017 | Girmonsky | |
| 9,952,902 | B1 * | 4/2018 | Chellappa | G06F 9/5011 |
| 10,275,284 | B2 * | 4/2019 | Poghosyan | G06F 9/5027 |
| 2006/0010101 | A1 * | 1/2006 | Suzuki | G06F 11/3452 |
| 2006/0161883 | A1 * | 7/2006 | Lubrecht | G06Q 10/06 717/104 |
| 2006/0161884 | A1 * | 7/2006 | Lubrecht | G06F 11/3442 717/104 |
| 2006/0287932 | A1 * | 12/2006 | Wulteputte | G06Q 10/06 705/26.4 |
| 2008/0271038 | A1 * | 10/2008 | Rolia | G06F 9/505 718/105 |
| 2011/0131589 | A1 * | 6/2011 | Beaty | G06F 9/5077 719/318 |
| 2011/0320391 | A1 * | 12/2011 | Chen | G06F 11/3452 706/14 |
| 2012/0079497 | A1 * | 3/2012 | Gangemi | G06F 9/5011 718/104 |
| 2012/0233328 | A1 * | 9/2012 | Iyoob | G06F 9/5061 709/226 |
| 2013/0060933 | A1 * | 3/2013 | Tung | G06F 11/3495 709/224 |
| 2014/0095696 | A1 * | 4/2014 | Sala | G06F 11/3409 709/224 |
| 2015/0332351 | A1 | 11/2015 | McBride et al. | |
| 2015/0341240 | A1 | 11/2015 | Iyoob et al. | |
| 2016/0248646 | A1 * | 8/2016 | Ashby, Jr. | H04L 47/78 |
| 2016/0283271 | A1 * | 9/2016 | Ashby, Jr. | G06F 9/5072 |
| 2016/0328273 | A1 | 11/2016 | Molka et al. | |

OTHER PUBLICATIONS

Schimunek, Gottried, WebSpehere Application Performance Sizing and Capacity Planning for iSeries ITSO iSeries Technical Forum, IBM, 2003 (Year: 2003).*

Gibbs, Benton G. et al., IBM eserver pSeries Sizing and Capacity Planning—A Practical Guide IBM, Redbkook SG24-7071-00, Mar. 2004 (Year: 2004).*

Ganesan, Rajeshwari et al., Analysis of SaaS Business Platform Workloads for Sizing and Collocation 2012 IEEE Fifth International Conference on Cloud Computing, 2012 (Year: 2012).*

Mohamad, Rafidah Pakir et al., Cloud Computing Workload and Capacity Management Using Domain Specific Modelling, 2013 (Year: 2013).*

Stahl, Elisabeth et al., Performance and Capacity Themes for Cloud Computing IBM Redbook REDP-4876-00, Mar. 2013 (Year: 2013).*

BlazeMeter, https://www.blazemeter.com, 2015, pp. 1-3.

amazon.com, "Elastic Compute Cloud EC2," https://aws.amazon.com/ec2, 2015, pp. 1-7.

Microsoft, "Microsoft Azure Services," https://azure.microsoft.com/en-us/services, 2015, pp. 1-53.

IBM, "IBM Content Capacity Planner Tool," https://www-356.ibm.com/partnerworld/wps/servlet/ContentHandler/swg_com_sfw_ecm_icc_planner_tool, 2015, one page.

Mao et al., "Scaling and Scheduling to Maximize Application Performance within Budget Constraints in Cloud Workflows," 27th International Symposium on Parallel & Distributed Processing (IPDPS), May 20-24, 2013, pp. 67-78.

Ostermann et al., "Using a New Event-Based Simulation Framework for Investigating Resource Provisioning in Clouds," Scientific Programming, vol. 19, 2011, pp. 161-178.

* cited by examiner

ESTIMATING SOFTWARE AS A SERVICE CLOUD COMPUTING RESOURCE CAPACITY REQUIREMENTS FOR A CUSTOMER BASED ON CUSTOMER WORKFLOWS AND WORKLOADS

TECHNICAL FIELD

The present invention relates generally to capacity planning, and more particularly to optimizing software deployment by simulating workloads and production systems to evaluate the capacity needs of the customer.

BACKGROUND

Customers need to determine the amount of computing resources that are required to be utilized when deploying software. Typically, sales engineers interface with customers to define these required computing resources to meet various customer requirements, such as transaction throughput, scalability, high availability/disaster recovery and operational costs.

Software as a service (SaaS) is a software licensing and delivery model in which software is licensed on a subscription basis and is centrally hosted. Typically, SaaS products can be evaluated with minimal information and purchased by entering billing information. More advanced licenses, however, may have the customer contact the sales department directly so that they understand the unique needs and requirements of the customer, and provide offerings unique for the customer as a whole (e.g., multi-product enterprise license for X users with a negotiable contract term).

Many companies use a freemium model to lower the barrier for evaluating SaaS products. Freemium is a pricing strategy by which a product (e.g., software) is provided free of charge, but money (premium) is charged for additional features or services. The freemium model enables the software provider to provide limited service for free, and expand to small teams, small/medium business, or to full enterprise license contracts. Depending on the tier of service, the customer will gain access to more features, support, reliability or other variations for the specific product offering terms.

Currently, customers may use a third party or internal data to determine if their capacity needs (i.e., the amount of computing resources) of their use case (i.e., particular workload to be implemented) are adequate for the SaaS or software offering. These benchmarks provide rough estimates on the computational power required to meet the requirements of these use cases. Although the benchmarks may provide a good estimate for the upfront and operational costs, the unique customer use case will often under/over plan the capacity once the software is deployed into a live production environment.

SUMMARY

In one embodiment of the present invention, a method for evaluating capacity needs of a customer comprises displaying industry workflows for a software product. The method further comprises receiving a selection of one of the displayed industry workflows or a custom workflow. The method additionally comprises determining initial workload estimates based on answers to a set of questions. Furthermore, the method comprises determining capacity requirements for implementing the selected industry workflow or the custom workflow based on the answers to the set of questions. Additionally, the method comprises creating, by a processor, a model to represent a data flow of the selected workflow or the custom workflow as well as represent transaction rates. In addition, the method comprises provisioning, by the processor, a system to simulate production usage based on the determined capacity requirements. The method further comprises simulating, by the processor, a workload based on the model and the initial workload estimates. The method additionally comprises monitoring, by the processor, usage patterns in the simulated workload. Furthermore, the method comprises updating, by the processor, capacity requirements of the system to reflect the monitored usage patterns. Additionally, the method comprises displaying the updated capacity requirements of the system to the customer.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for evaluating the capacity needs of a customer. In one embodiment of the present invention, industry workflows for a software product are displayed to the customer. A selection of one of these industry workflows is received from the customer, or alternatively, the customer provides a custom workflow. A "workflow," as used herein, refers to a series of actions or activities that are necessary to complete a task. Furthermore, initial workload estimates are determined based on the answers provided by the customer to a set of questions presented to the customer. These questions may pertain to the specific details of the selected or custom workflow whose answers provide insights into the customer's workload (amount of processing to be performed by customer's computing system(s) to run the deployed software product). Furthermore, the capacity requirements (amount of computing resources, such as the amount of memory, storage and processing to be utilized) for implementing the selected industry workflow or the custom workflow are determined based on the answers provided by the customer to a set of questions presented to the customer. Once the customer provides specific details for their industry workload, a model is created to represent a data flow of the selected workflow or the custom workflow as well as represent the transaction rates. A system is provisioned to simulate production usage based on the determined capacity requirements. Furthermore, a workload is simulated based on the created model and the initial workload estimates. The usage patterns in the simulated workload and the usage of the provisioned system are monitored. The capacity requirements (computing resources) of the system are then updated to reflect the monitored usage patterns and actual system usage. That is, the capacity requirements of the system, such as the amount of memory, storage and processing to be utilized, are updated to reflect real world activity. The updated capacity requirements of the system are then displayed to the customer. In this manner, a more accurate assessment of the capacity requirements for deploying software into a live production environment can be made. As a result, the process of software deployment is optimized since it is known if the customer's capacity needs of their use case are adequate for the SaaS or software offering.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
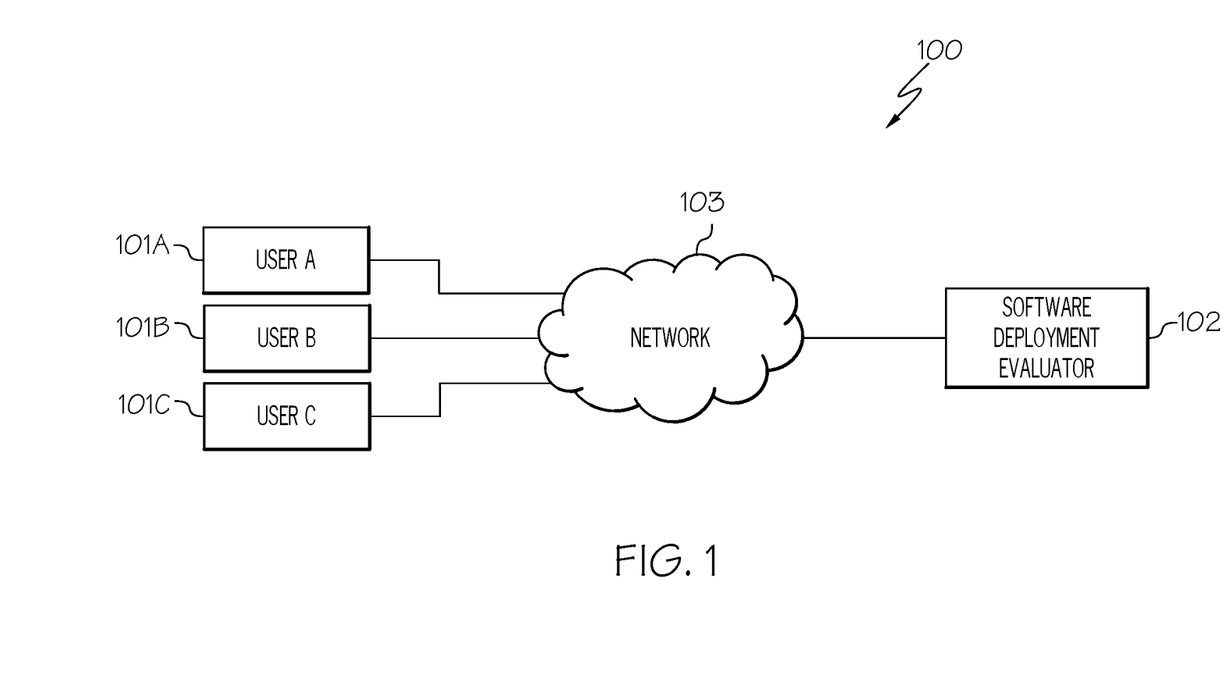
FIG. 1 illustrates a system configured in accordance with an embodiment of the present invention.

Referring now to the Figures in detail, FIG. 1 illustrates a system 100 configured in accordance with an embodiment of the present invention. System 100 includes users 101A-101C (identified as "User A," "User B," and "User C," respectively in FIG. 1) connected to a software deployment evaluator 102 via a network 103. Users 101 (also referred to as "customers" herein) may collectively or individually be referred to as users 101 or user 101, respectively. User 101 (or customer 101) refers to the actual individual or computing device utilized by the user. Such a computing device includes a portable computing unit, a Personal Digital Assistant (PDA), a smartphone, a laptop computer, a mobile phone, a navigation device, a game console, a desktop computer system, a workstation, an Internet appliance and the like configured with the capability of connecting to network 103 and consequently communicating with software deployment evaluator 102 as discussed below.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Software deployment evaluator 102 is configured to optimize software deployment by simulating workloads and production systems as discussed further below in connection with FIGS. 2-7. Furthermore, software deployment evaluator 102 optimizes the software deployment based on various deployment attributes, such as by providing customers 101 valid options for software deployment depending on their use case (i.e., particular workflow to be implemented) and expected performance. Software deployment evaluator 102 is further configured to provide capacity planning from end-user constraints. Furthermore, software deployment evaluator 102 provides prospective customers (users 101) the ability to design a realistic workload based on their industry specific requirements. A workload, as used herein, refers to the amount of processing to be performed by a computing system(s). Furthermore, software deployment evaluator 102 allows the prospective customer to determine operational costs and consider various options for when the software product will need to be expanded to scale. A further discussion of the functionalities of software deployment evaluator 102 is provided further below in connection with FIGS. 3-7. A description of an embodiment of a hardware configuration of software deployment evaluator 102 is provided below in connection with FIG. 2.

Figure 2:
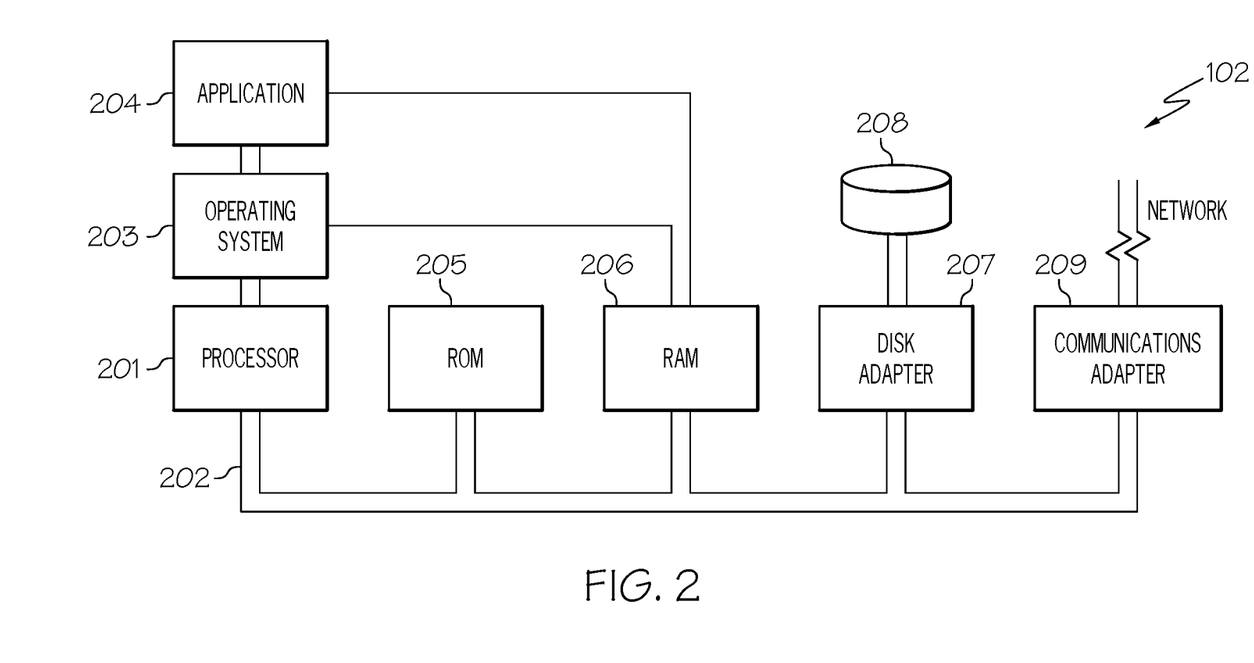
FIG. 2 illustrates an embodiment of the present invention of a hardware configuration of the software deployment evaluator which is representative of a hardware environment for practicing the present invention.

Referring now to FIG. 2, FIG. 2 illustrates an embodiment of the present invention of a hardware configuration of software deployment evaluator 102 (FIG. 1) which is representative of a hardware environment for practicing the present invention. Referring to FIG. 2, software deployment evaluator 102 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for optimizing software deployment by simulating workloads and production systems as discussed further below in connection with FIGS. 3-7.

Referring again to FIG. 2, read-only memory ("ROM") 205 is coupled to system bus 202 and includes a basic input/output system ("BIOS") that controls certain basic functions of software deployment evaluator 102. Random access memory ("RAM") 206 and disk adapter 207 are also coupled to system bus 202. It should be noted that software components including operating system 203 and application 204 may be loaded into RAM 206, which may be software deployment evaluator's 102 main memory for execution. Disk adapter 207 may be an integrated drive electronics ("IDE") adapter that communicates with a disk unit 208, e.g., disk drive. It is noted that the program for optimizing software deployment by simulating workloads and production systems, as discussed further below in connection with FIGS. 3-7, may reside in disk unit 208 or in application 204.

Software deployment evaluator 102 further includes a communications adapter 209 coupled to bus 202. Communications adapter 209 interconnects bus 202 with an outside network (e.g., network 103 of FIG. 1) thereby allowing software deployment evaluator 102 to communicate with other devices, such as users/customers 101.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently, customers may use a third party or internal data to determine if their capacity needs (i.e., the amount of computing resources) of their use case (i.e., particular workload to be implemented) are adequate for the SaaS or software offering. These benchmarks provide rough estimates on the computational power required to meet the requirements of these use cases.

Although the benchmarks may provide a good estimate for the upfront and operational costs, the unique customer use case will often under/over plan the capacity once the software is deployed into a live production environment.

Figure 3:
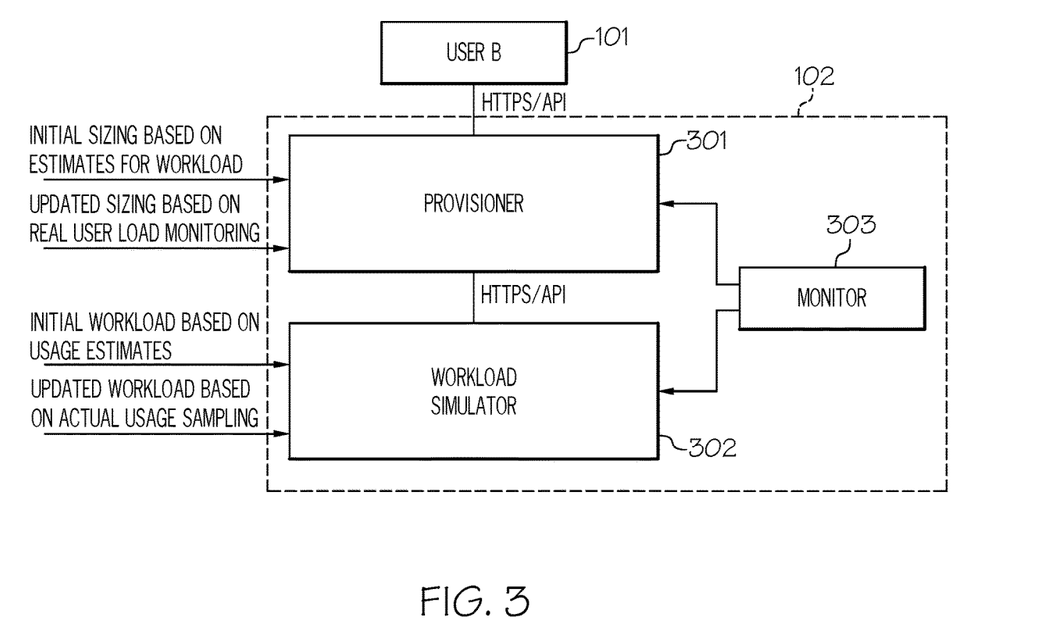
FIG. 3 is a diagram of the software components of the software deployment evaluator used to optimize the software deployment process in accordance with an embodiment of the present invention.
Figure 4:
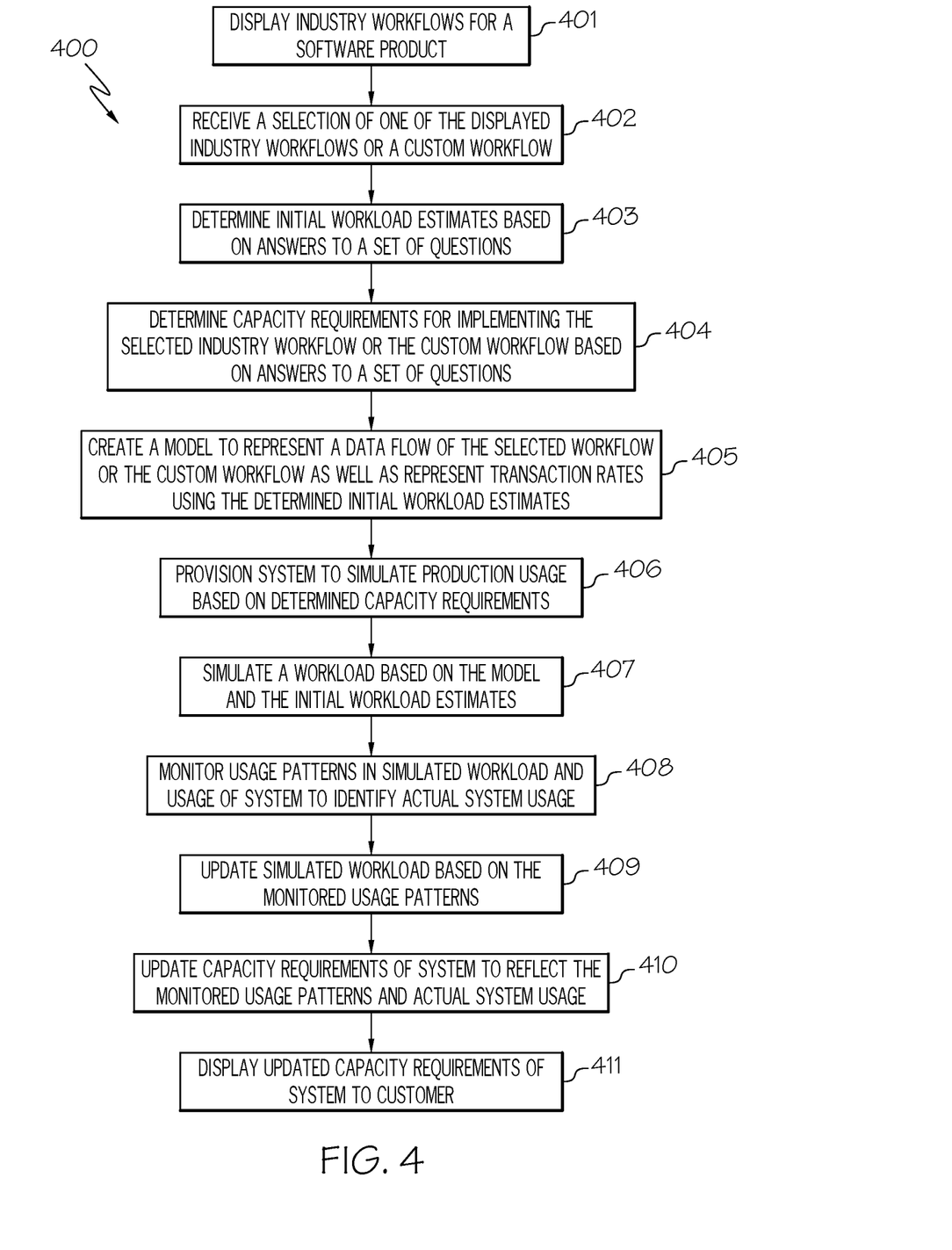
FIG. 4 is a flowchart of a method for optimizing the software deployment process in accordance with an embodiment of the present invention.
Figure 5:
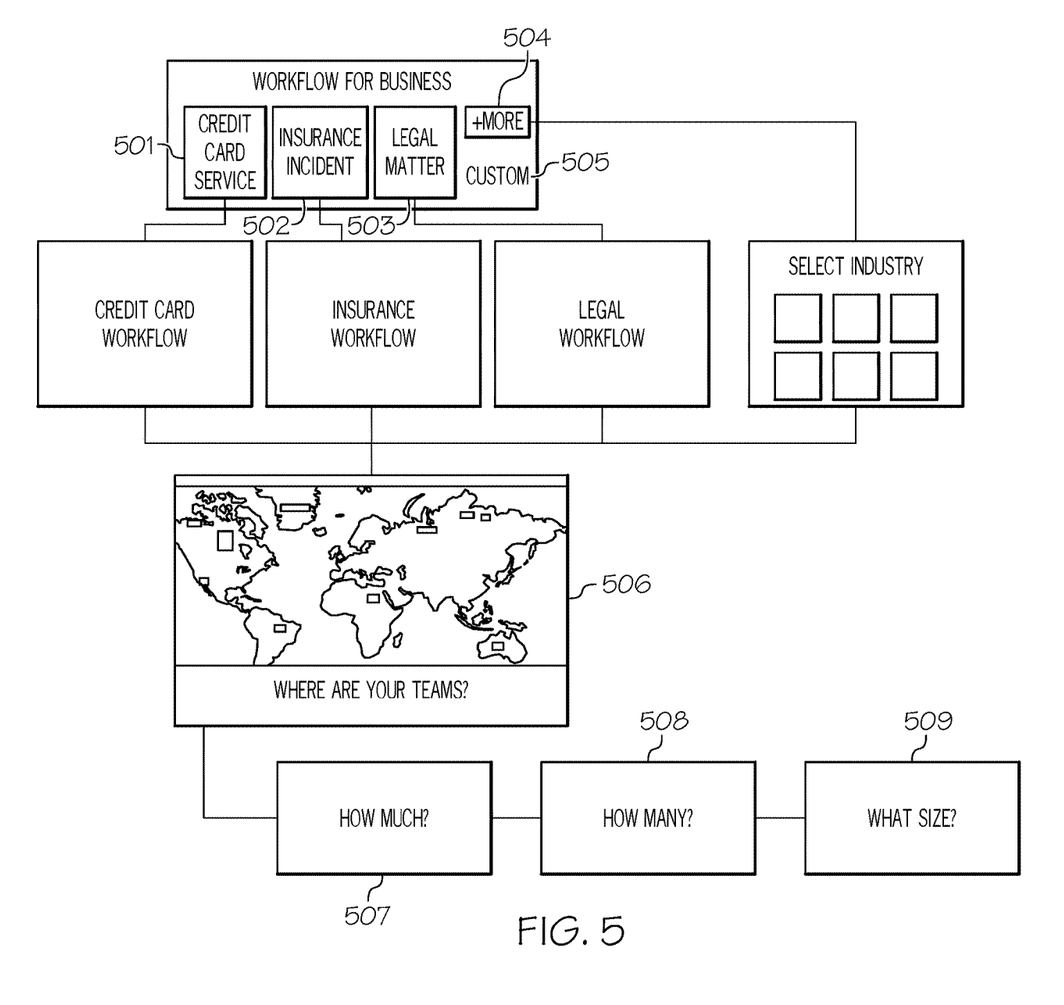
FIG. 5 illustrates sample industry specific workflows presented to the customer in accordance with an embodiment of the present invention.
Figure 6:
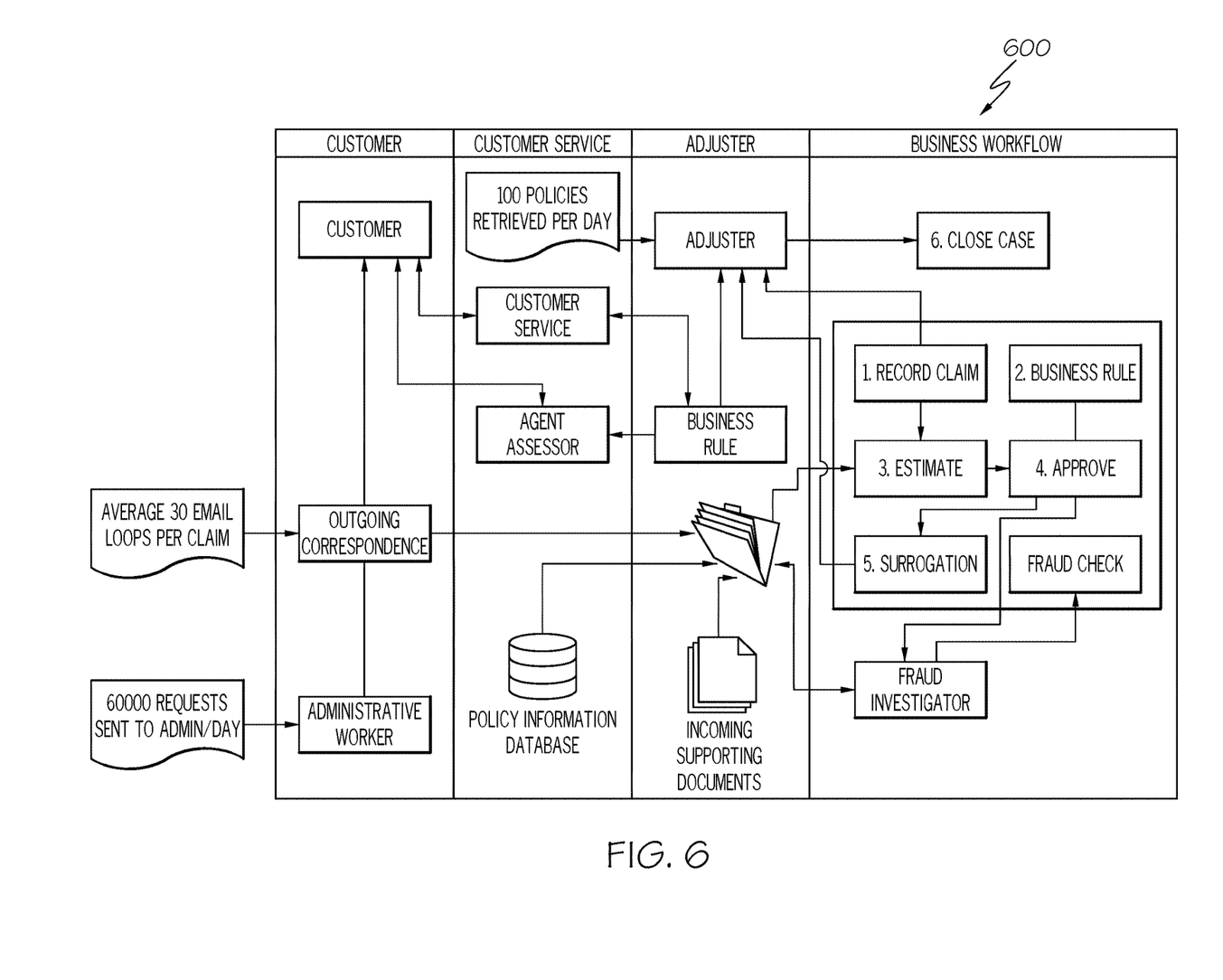
FIG. 6 illustrates a model of an insurance workflow as well as the transaction rates in accordance with an embodiment of the present invention.
Figure 7:
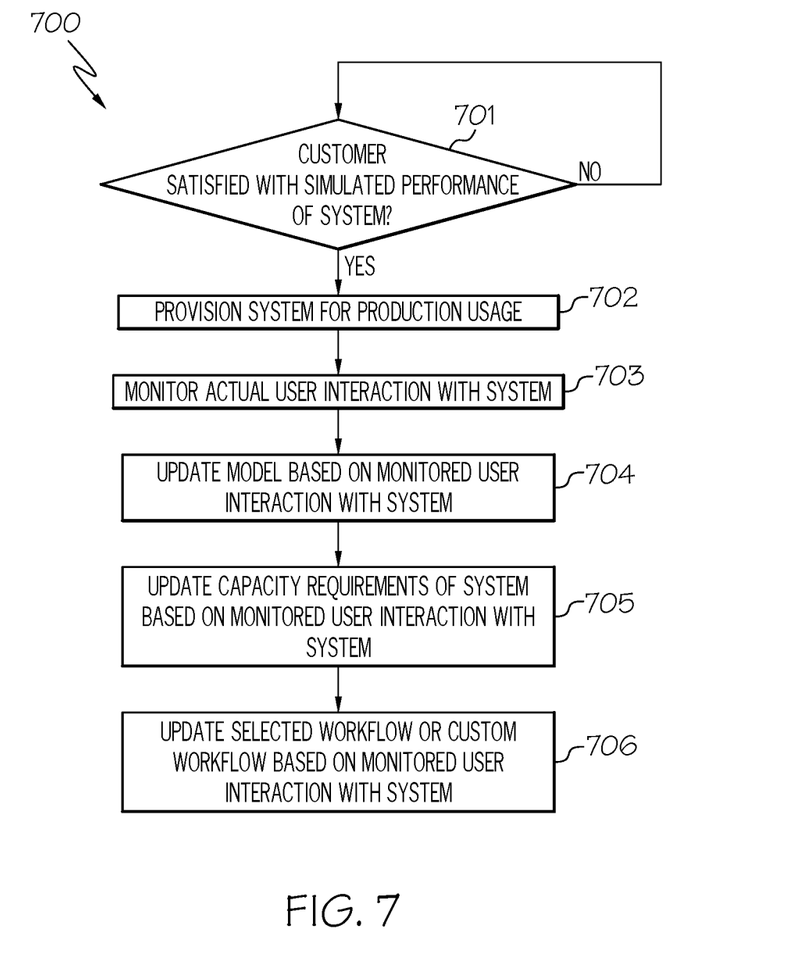
FIG. 7 is a flowchart of a method for continually monitoring user interaction with the production system to update the workflow, model and capacity requirements to better reflect the needs of the customer in accordance with an embodiment of the present invention.

The principles of the present invention provide a means for improving the software deployment process by simulating workloads and production systems to more accurately reflect the needs of the customer in terms of software requirements, load requirements, workflow requirements, workload requirements, etc. as discussed further below in connection with FIGS. 3-7. FIG. 3 is a diagram of the software components of software deployment evaluator 102 used to optimize the software deployment process. FIG. 4 is a flowchart of a method for optimizing the software deployment process. FIG. 5 illustrates sample industry specific workflows presented to the customer. FIG. 6 illustrates a model of an insurance workflow as well as the transaction rates. FIG. 7 is a flowchart of a method for continually monitoring user interaction with the production system to update the workflow, model and capacity requirements to better reflect the needs of the customer.

As stated above, FIG. 3 is a diagram of the software components of software deployment evaluator 102 used to optimize the software deployment process in accordance with an embodiment of the present invention. In one embodiment, these software components may reside in application 204 (FIG. 2) of software deployment evaluator 102.

The following provides a brief description of these software components. A more detailed description of these software components (including their functionalities) is provided below in conjunction with FIGS. 4-7.

Referring to FIG. 3, in conjunction with FIGS. 1-2, software deployment evaluator 102 utilizes a "provisioner" 301 to provision a system to be tested for simulated production usage or for actual production usage. The initial "sizing" of the system (referring to the amount of computing resources) may be based on the estimates for the workload, which may be inferred based on the answers provided by customer 101 in response to questions generated by software deployment evaluator 102. Furthermore, the sizing of the system may be updated based on monitoring the load requirements of customer 102. The load requirements, as used herein, refer to the demand on the software system.

Additionally, software deployment evaluator 102 utilizes a workload simulator 302 that communicates with provisioner 301 via Hypertext Transfer Protocol over Transport Layer Security (HTTPS)/application programming interface (API). Workload simulator 302 is configured to simulate the workload based on a model created by software deployment evaluator 102 (model representing the data flow of a workflow and transaction rates) and the initial workload estimates. Furthermore, the workload is updated based on actual usage sampling as discussed further below.

In connection with testing the system and simulating the workload, monitor 303 is configured to monitor the usage patterns in the simulated workload as well as the usage of the tested system. Such monitoring may be used to update the capacity requirements of the system as discussed further below.

If the customer is satisfied with the simulated performance of the system, then the system is provisioned for actual usage by provisioner 301. The system provisioned for production usage is then utilized by actual users 101 via HTTPS/API. Based on monitoring such activity, the model, capacity requirements of the system and/or the workflow may be updated to better reflect the real world usage.

A more detailed description of the software components (including their functionalities) of software deployment evaluator 102 is provided below in conjunction with FIG. 4.

FIG. 4 is a flowchart of a method 400 for optimizing the software deployment process in accordance with an embodiment of the present invention.

Referring to FIG. 4, in conjunction with FIGS. 1-3, in step 401, software deployment evaluator 102 displays industry workflows for a software product as shown in FIG. 5. In step 402, software deployment evaluator 102 receives a selection of one of the displayed industry workflows or a custom workflow. A "workflow," as used herein, refers to a series of actions or activities that are necessary to complete a task. In one embodiment, customer 101 will be prompted with an interactive scenario for how the software product may be used as shown in FIG. 5.

FIG. 5 illustrates sample industry specific workflows to be presented to customer 101 in accordance with an embodiment of the present invention. For example, workflows for credit card service 501, insurance incident 502 and legal matter 503 may be presented to customer 101. Other variations include providing the user the option to select different workflows via the "more" button 504 as well as allowing the customer to submit a customized workflow via the "custom" button 505.

Upon selecting an industry workflow or providing a custom workflow, customer 101 can refine the use case (i.e., the workflow) to reflect how they intend to use the system. "System," as used herein, refers to the customer's software system to execute the software product. Details for the customer's specific requirements will be collected by software deployment evaluator 102 to determine the sizing of the system for their intended usage. For example, the locations of the customer's worldwide users (see element 506) and user centric questions for capacity planning (see elements 507-509) may be provided to customer 101 by software deployment evaluator 102. For example, questions, such as "how much? 507," "how many? 508," and "what size? 509," may be presented to customer 101.

For instance, the following questions may be presented to customer 101 to determine specific details for a customer's insurance workflow: "How much data exists for a single insurance claim (number of files)?"; "How many users are located in the New York site?"; "How many insurance claims are opened in an average day per user?"; "How many insurance claims are closed in an average day per user?"; "How many images will be collected for an insurance claim?"; and "What size (number of gigabytes) is an example for an insurance claim?".

In one embodiment, in addition to customer 101 providing the specific workflow, the user may input load and transaction rates to software deployment evaluator 102. In another embodiment, customer 101 may input the user locations for latency simulation to software deployment evaluator 102.

Additionally, in one embodiment, customer 101 may provide representative data specific to the industry use case. In one example, the user may provide pre-populated simulation data to be used by workload simulator 302. In another example, customer 101 may provide actual data so that workload simulator 302 will be trained using real data and be updated to provide a reasonable solution to customer 101.

In another embodiment, customer 101 may provide options for data redundancy across various data center locations or provide options for data sovereignty across various data center locations.

Returning to FIG. 4, in conjunction with FIGS. 1-3 and 5, in step 403, software deployment evaluator 102 determines the initial workload estimates based on answers provided by customer 101 to the questions presented to customer 101 by software deployment evaluator 102 as discussed above. As previously discussed, questions pertaining to the specific details of a selected or custom workflow will be presented to customer 101 by software deployment evaluator 102 whose answers provide insights into the customer's workload (amount of processing to be performed by customer's computing system(s) to run the deployed software product). For example, by identifying the number of insurance claims to be opened and closed on average per day, the number of images collected for an insurance claims, etc., a more accurate assessment of the customer's workload can be made.

In step 404, software deployment evaluator 102 determines the capacity requirements (amount of computing resources, such as the amount of memory, storage and processing to be utilized) for implementing the selected industry workflow or the custom workflow based on the answers provided by customer 101 to the questions presented to customer 101 by software deployment evaluator 102 as discussed above. For example, by identifying the number of insurance claims to be opened and closed on average per day, the number of images collected for an insurance claims, etc., a more accurate assessment of the customer's capacity requirements can be made.

Once the user provides specific details for their industry workload, in step 405, software deployment evaluator 102 creates a model to represent a data flow of the selected workflow or the custom workflow as well as represent the transaction rates using the determined initial workload estimates as shown in FIG. 6. The model can be fine-tuned to reflect actual business processes and will be used to implement the workflow for a performance test as discussed further below.

Referring to FIG. 6, FIG. 6 illustrates a model 600 of an insurance workflow as well as the transaction rates in accordance with an embodiment of the present invention. For example, as shown in FIG. 6, the transaction rates involve an average of 30 email loops per claim and 60,000 requests are sent to the administrator per day. Furthermore, model 600 illustrates the data flow between the customer, the customer service, the adjuster and the business workflow.

Returning to FIG. 4, in conjunction with FIGS. 1-3 and 5-6, in step 406, software deployment evaluator 102 (provisioner 301) provisions the system to simulate production usage based on the determined capacity requirements. In one embodiment, the initial sizing estimates from customer 101 (based on estimates for the workload) will be used to provision the system to meet the capacity needs of the customer's unique use case and usage patterns.

In step 407, software deployment evaluator 102 (simulator 302) simulates a workload based on the created model and the initial workload estimates. In one embodiment, the system will be used by an automated test harness (simulator 302) using virtual users (e.g., the test harness may be Apache JMeter™ or IBM® Rational® Performance Tester). The simulated workload uses the initial sizing estimates based on the answers collected as discussed above and the model created in step 405. As discussed further below, after the simulated workload completes, then the actual capacity requirements of the system can be updated to reflect the usage patterns for the customer specific use case.

In step 408, software deployment evaluator 102 (monitor 303) monitors the usage patterns in the simulated workload as well as monitors the usage of the provisioned system to identify actual system usage. In this manner, software deployment evaluator 102 may identify performance bottlenecks.

In step 409, software deployment evaluator 102 updates the simulated workload based on the monitored usage patterns.

In step 410, software deployment evaluator 102 updates the capacity requirements (computing resources) of the system to reflect the monitored usage patterns and the actual system usage. That is, software deployment evaluator 102 updates the capacity requirements of the system, such as the amount of memory, storage and processing to be utilized, to reflect real world activity. In this manner, a more accurate assessment of the capacity requirements for deploying software into a live production environment can be made.

In step 411, software deployment evaluator 102 displays the updated capacity requirements of the system to customer 101, such as via a user interface on the customer's computing device.

After the customer is satisfied with the simulated performance of the system, actual users 101 may interact with the production system as discussed below in connection with FIG. 7.

FIG. 7 is a flowchart of a method 700 for continually monitoring user interaction with the production system to update the workflow, model and capacity requirements to better reflect the needs of the customer in accordance with an embodiment of the present invention.

Referring to FIG. 7, in conjunction with FIGS. 1-6, in step 701, a determination is made by software deployment evaluator 102 as to whether customer 101 is satisfied with the simulated performance of the system.

If customer 101 is not satisfied with the simulated performance of the system, then software deployment evaluator 102 continues to determine whether customer 101 is satisfied with the simulated performance of the system in step 701.

If, however, customer 101 is satisfied with the simulated performance of the system, then, in step 702, software deployment evaluator 102 (provisioner 301) provisions the system for production usage.

In step 703, software deployment evaluator 102 (monitor 303) monitors the actual user interaction with the provisioned system for production usage. In response to monitoring the actual user interaction with the system, software deployment evaluator 102 may perform any one of the updates discussed in steps 704-706 if they are deemed necessary, such as if the variation in the recently determined model or workflow from the previous version of the model or workflow exceeds a threshold, which may be user-selected. In another example, software deployment evaluator 102 may perform an update to the capacity requirements of the system if the variation in the recently determined capacity requirements from the previously determined capacity requirements exceeds a threshold, which may be user-selected. In this manner, a more accurate assessment of the capacity requirements, the customer's workflow and the customer's workload for deploying software into a live production environment can be made.

In step 704, software deployment evaluator 102 updates the model based on the monitored user interaction with the system.

In step 705, software deployment evaluator 102 updates the capacity requirements of the system based on the monitored user interaction with the system.

In step 706, software deployment evaluator 102 updates the selected workflow or the custom workflow based on the monitored user interaction with the system.

In this manner, customers 101 will be able to iteratively monitor, size and plan updates as their use case evolves over their usage and growth of the system. As a result, a more accurate assessment of the capacity requirements, the customer's workflow and the customer's workload for deploying software into a live production environment can be made. That is, the technical problem of ensuring the capacity needs (i.e., the amount of computing resources) of the customer's use case (i.e., particular workload to be implemented) are adequate for the SaaS or software offering is addressed by the present invention. As discussed above, the present invention provides a technological solution to the technical problem by accurately assessing the customer's capacity requirements, the customer's workflow and the customer's workload thereby ensuring that the customer's capacity needs are adequate for the SaaS or software offering.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for evaluating software product capacity needs of a customer, the method comprising:
  displaying an industry insurance workflow for a software product by a software deployment evaluator computing device, said software deployment evaluator computing device utilizes a second software component that communicates with a first software component that provisions a system to be tested for production usage via a hypertext transfer protocol over a transport layer security application programming interface;
  utilizing, by said customer, a computing device connected to said software deployment evaluator computing device via a network to evaluate software product capacity needs of said customer;
  simulating, by said second software component, a software product workload based on an existing model and initial workload estimates;
  monitoring, by said software deployment evaluator computing device comprising a monitor, software product usage patterns in said simulated workload as well as usage of a tested system;
  receiving a selection of said displayed industry insurance workflow by said software deployment evaluator computing device, wherein said displayed industry insurance workflow comprises a series of actions or activities that are necessary to complete a task;
  receiving input from said customer concerning a specific set of requirements for how said software product is used upon selecting said displayed industry insurance workflow;
  collecting information pertaining to said selected displayed industry insurance workflow by said software deployment evaluator computing device;
  receiving software product load and transaction rates by said software deployment evaluator computing device from said customer;
  receiving physical user locations for latency simulation by said software deployment evaluator computing device from said customer;
  receiving pre-populated simulation data to be used by said second software component by said software deployment evaluator computing device from said customer;
  receiving data from said customer by said software deployment evaluator computing device to train said second software component;
  training said second software component utilizing said received data;
  receiving, by said software deployment evaluator computing device, software product initial workload estimates;
  receiving, by said software deployment evaluator computing device, capacity requirements for implementing said selected displayed industry insurance workflow that was based on said collected information, said received load and transaction rates, said received physical user locations for latency simulation, said received pre-populated simulation data, and said received data to train said second software component;
  simulating, by said second software component, a software product workload based on said existing model and said initial workload estimates, wherein said second software component comprises an automated test harness, wherein said automated test harness comprises a load testing tool;
  monitoring, by said monitor, software product usage patterns in said simulated workload as well as monitoring, by said monitor, usage of a provisioned system that was provisioned by said first software component to identify actual system usage;
  identifying performance bottlenecks based on said identified actual system usage;
  updating, by said software deployment evaluator computing device, software product capacity requirements of said system to reflect said monitored usage patterns and said actual system usage in order to provide a more accurate assessment of capacity requirements for deploying said software product into a live production environment, wherein said software product capacity requirements of said system comprise an amount of memory, storage and processing to be utilized;
  displaying said updated software product capacity requirements of said system to said customer via a user interface of said computing device of said customer; and
  iteratively monitoring usage of said provisioned system, updating of said capacity requirements of said system based on said monitored usage of said provisioned system and displaying said updated software product capacity requirements thereby providing a more accurate assessment of said capacity requirements of said system, customer's workflow and customer's workload for deploying software into said live production environment so as to address a technical problem of ensuring that capacity needs of a customer's use case are adequate for software as a service or software offering.

2. The method as recited in claim 1 further comprising:
  determining whether said customer is satisfied with simulated performance of said system.

3. The method as recited in claim 1 further comprising: updating said simulated workload based on said monitored usage patterns.

4. The method as recited in claim 2 further comprising: provisioning said system for production usage in response to said customer being satisfied with the simulated performance of said system.

5. The method as recited in claim 4 further comprising: monitoring actual user interaction with said provisioned system for production usage.

6. The method as recited in claim 5 further comprising: updating said existing model based on said monitored user interaction with said provisioned system for production usage or updating said capacity requirements of said system based on said monitored user interaction with said provisioned system for production usage in response to a variation in a recently determined model from a previous version of said existing model exceeding a first threshold or in response to a variation in recently determined capacity requirements from a previously determined capacity requirements exceeding a second threshold, respectively, thereby providing a more accurate assessment of said capacity requirements, said customer's workflow and said customer's workload for deploying software into said live production environment.

7. The method as recited in claim 5 further comprising: updating said selected displayed industry insurance workflow based on said monitored user interaction with said provisioned system for production usage in response to a variation in a recently determined workflow from a previous version of said workflow exceeding a threshold thereby providing a more accurate assessment of said capacity requirements, said customer's workflow and said customer's workload for deploying software into said live production environment.

8. A computer program product for evaluating software product capacity needs of a customer, the computer program product comprising a computer readable storage medium having program code embodied therewith, the program code comprising the programming instructions for:

displaying an industry insurance workflow for a software product by a software deployment evaluator computing device, said software deployment evaluator computing device utilizes a second software component that communicates with a first software component that provisions a system to be tested for production usage via a hypertext transfer protocol over a transport layer security application programming interface;

utilizing, by said customer, a computing device connected to said software deployment evaluator computing device via a network to evaluate software product capacity needs of said customer;

simulating, by said second software component, a software product workload based on an existing model and initial workload estimates;

monitoring, by said software deployment evaluator computing device comprising a monitor, software product usage patterns in said simulated workload as well as usage of a tested system;

receiving a selection of said displayed industry insurance workflow by said software deployment evaluator computing device, wherein said displayed industry insurance workflow comprises a series of actions or activities that are necessary to complete a task;

receiving input from said customer concerning a specific set of requirements for how said software product is used upon selecting said displayed industry insurance workflow;

collecting information pertaining to said selected displayed industry insurance workflow by said software deployment evaluator computing device;

receiving software product load and transaction rates by said software deployment evaluator computing device from said customer;

receiving physical user locations for latency simulation by said software deployment evaluator computing device from said customer;

receiving pre-populated simulation data to be used by said second software component by said software deployment evaluator computing device from said customer;

receiving data from said customer by said software deployment evaluator computing device to train said second software component;

training said second software component utilizing said received data;

receiving, by said software deployment evaluator computing device, software product initial workload estimates;

receiving, by said software deployment evaluator computing device, capacity requirements for implementing said selected displayed industry insurance workflow that was based on said collected information, said received load and transaction rates, said received physical user locations for latency simulation, said received pre-populated simulation data, and said received data to train said second software component;

simulating, by said second software component, a software product workload based on said existing model and said initial workload estimates, wherein said second software component comprises an automated test harness, wherein said automated test harness comprises a load testing tool;

monitoring, by said monitor, software product usage patterns in said simulated workload as well as monitoring, by said monitor, usage of a provisioned system that was provisioned by said first software component to identify actual system usage;

identifying performance bottlenecks based on said identified actual system usage;

updating, by said software deployment evaluator computing device, software product capacity requirements of said system to reflect said monitored usage patterns and said actual system usage in order to provide a more accurate assessment of capacity requirements for deploying said software product into a live production environment, wherein said software product capacity requirements of said system comprise an amount of memory, storage and processing to be utilized;

displaying said updated software product capacity requirements of said system to said customer via a user interface of said computing device of said customer; and iteratively monitoring usage of said provisioned system, updating of said capacity requirements of said system based on said monitored usage of said provisioned system and displaying said updated software product capacity requirements thereby providing a more accurate assessment of said capacity requirements of said system, customer's workflow and customer's workload for deploying software into said live production environment so as to address a technical problem of ensuring that capacity needs of a customer's use case are adequate for software as a service or software offering.

9. The computer program product as recited in claim 8, wherein the program code further comprises the programming instructions for:
determining whether said customer is satisfied with simulated performance of said system.

10. The computer program product as recited in claim 8, wherein the program code further comprises the programming instructions for:
updating said simulated workload based on said monitored usage patterns.

11. The computer program product as recited in claim 9, wherein the program code further comprises the programming instructions for:
provisioning said system for production usage in response to said customer being satisfied with the simulated performance of said system.

12. The computer program product as recited in claim 11, wherein the program code further comprises the programming instructions for:
monitoring actual user interaction with said provisioned system for production usage.

13. The computer program product as recited in claim 12, wherein the program code further comprises the programming instructions for:
updating said existing model based on said monitored user interaction with said provisioned system for production usage or updating said capacity requirements of said system based on said monitored user interaction with said provisioned system for production usage in response to a variation in a recently determined model from a previous version of said existing model exceeding a first threshold or in response to a variation in recently determined capacity requirements from a previously determined capacity requirements exceeding a second threshold, respectively, thereby providing a more accurate assessment of said capacity requirements, said customer's workflow and said customer's workload for deploying software into said live production environment.

14. The computer program product as recited in claim 12, wherein the program code further comprises the programming instructions for:
updating said selected displayed industry insurance workflow based on said monitored user interaction with said provisioned system for production usage in response to a variation in a recently determined workflow from a previous version of said workflow exceeding a threshold thereby providing a more accurate assessment of said capacity requirements, said customer's workflow and said customer's workload for deploying software into said live production environment.

15. A software deployment evaluator computing device, comprising:
a memory for storing a computer program for evaluating software product capacity needs of a customer; and
a processor connected to the memory, wherein the processor is configured to execute the program instructions of the computer program comprising:
displaying an industry insurance workflow for a software product by a software deployment evaluator computing device, said software deployment evaluator computing device utilizes a second software component that communicates with a first software component that provisions a system to be tested for production usage via a hypertext transfer protocol over a transport layer security application programming interface;
utilizing, by said customer, a computing device connected to said software deployment evaluator computing device via a network to evaluate software product capacity needs of said customer;
simulating, by said second software component, a software product workload based on an existing model and initial workload estimates;
monitoring, by said software deployment evaluator computing device comprising a monitor, software product usage patterns in said simulated workload as well as usage of a tested system;
receiving a selection of said displayed industry insurance workflow by said software deployment evaluator computing device, wherein said displayed industry insurance workflow comprises a series of actions or activities that are necessary to complete a task;
receiving input from said customer concerning a specific set of requirements for how said software product is used upon selecting said displayed industry insurance workflow;
collecting information pertaining to said selected displayed industry insurance workflow by said software deployment evaluator computing device;
receiving software product load and transaction rates by said software deployment evaluator computing device from said customer;
receiving physical user locations for latency simulation by said software deployment evaluator computing device from said customer;
receiving pre-populated simulation data to be used by said second software component by said software deployment evaluator computing device from said customer;
receiving data from said customer by said software deployment evaluator computing device to train said second software component;
training said second software component utilizing said received data;
receiving software product initial workload estimates;
receiving capacity requirements for implementing said selected displayed industry insurance workflow that was based on said collected information, said received load and transaction rates, said received physical user locations for latency simulation, said received pre-populated simulation data, and said received data to train said second software component;
simulating, by said second software component, a software product workload based on said existing model and said initial workload estimates, wherein said second software component comprises an automated test harness, wherein said automated test harness comprises a load testing tool;
monitoring, by said monitor, software product usage patterns in said simulated workload as well as monitoring, by said monitor, usage of a provisioned system that was provisioned by said first software component to identify actual system usage;
identifying performance bottlenecks based on said identified actual system usage;
updating software product capacity requirements of said system to reflect said monitored usage patterns and said actual system usage in order to provide a more accurate assessment of capacity requirements for deploying said software product into a live production environment, wherein said software product capacity requirements of said system comprise an amount of memory, storage and processing to be utilized;

displaying said updated software product capacity requirements of said system to said customer via a user interface of said computing device of said customer; and iteratively monitoring usage of said provisioned system, updating of said capacity requirements of said system based on said monitored usage of said provisioned system and displaying said updated software product capacity requirements thereby providing a more accurate assessment of said capacity requirements of said system, customer's workflow and customer's workload for deploying software into said live production environment so as to address a technical problem of ensuring that capacity needs of a customer's use case are adequate for software as a service or software offering.

16. The system as recited in claim 15, wherein the program instructions of the computer program further comprise:

determining whether said customer is satisfied with simulated performance of said system.

17. The system as recited in claim 15, wherein the program instructions of the computer program further comprise:

updating said simulated workload based on said monitored usage patterns.

18. The system as recited in claim 16, wherein the program instructions of the computer program further comprise:

provisioning said system for production usage in response to said customer being satisfied with the simulated performance of said system.

19. The system as recited in claim 18, wherein the program instructions of the computer program further comprise:

monitoring actual user interaction with said provisioned system for production usage.

20. The system as recited in claim 19, wherein the program instructions of the computer program further comprise:

updating said existing model based on said monitored user interaction with said provisioned system for production usage or updating said capacity requirements of said system based on said monitored user interaction with said provisioned system for production usage in response to a variation in a recently determined model from a previous version of said existing model exceeding a first threshold or in response to a variation in recently determined capacity requirements from a previously determined capacity requirements exceeding a second threshold, respectively, thereby providing a more accurate assessment of said capacity requirements, said customer's workflow and said customer's workload for deploying software into said live production environment.

* * * * *